July 9, 1940.  F. L. G. KOLLMORGEN  2,207,124
RIFLE SIGHTING TELESCOPE
Filed March 8, 1938
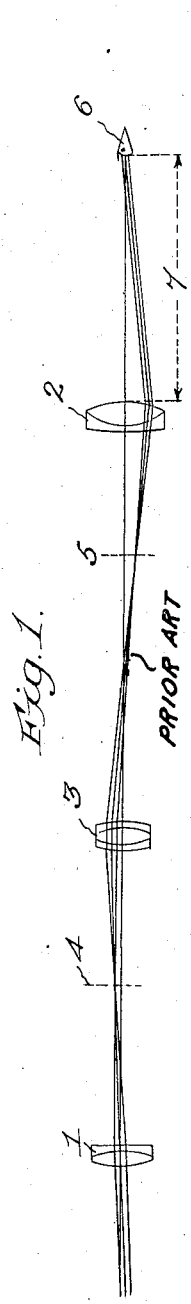
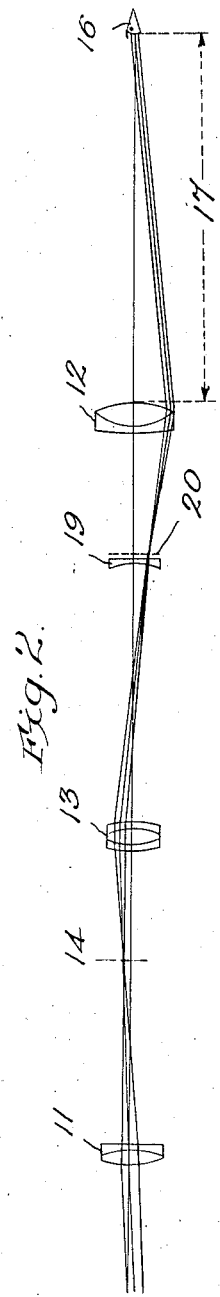
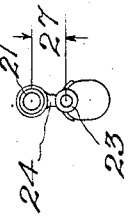
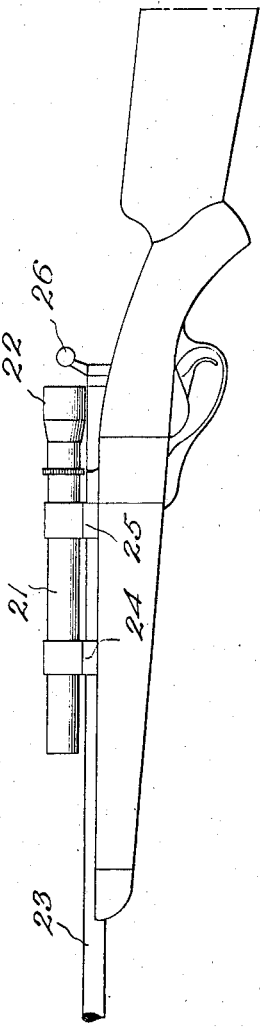
INVENTOR.
Frederick L. G. Kollmorgen
BY
ATTORNEY.

Patented July 9, 1940

2,207,124

UNITED STATES PATENT OFFICE 2,207,124

RIFLE-SIGHTING TELESCOPE

Frederick L. G. Kollmorgen, Mountain Lakes, N. J.

Application March 8, 1938, Serial No. 194,559

2 Claims. (Cl. 88—32)

The present invention relates to telescopes, and, more particularly, to a rifle-sighting telescope of novel and improved character.

As those skilled in the art know, the eye piece lens or lens system in a telescope forms an image of the objective lens or lens system which can be seen as a small, luminous circle on the observer's side of the eye lens. This luminous circle is known as the "exit pupil" of the telescope, and the pupil of the observer's eye must be brought into coincidence with the exit pupil, to enable him to see the entire field of view at one time. If the equivalent focal length of the eye piece is denoted by F, the distance between telescope objective and eye piece by A, and the eye piece is assumed to be a thin lens, then the distance B of the exit pupil from the eye lens is found by the equation $$\frac{1}{B} = \frac{1}{F} - \frac{1}{A}$$

The quantities in the formula are given in absolute measure. As clearly appears from this well-known formula, B becomes larger as A decreases. In other words, the distance of the exit pupil from the eye piece increases as the telescope is shortened, the eye piece being constant.

Of course, the image seen in an astronomical telescope is inverted. An erect image may be obtained by placing one or more convex lenses in proper position between the object glass and the eye piece. The principle of the astronomical telescope also applies to the erecting telescope where, however, the erecting lenses can be made to image themselves as exit pupil objectives by making them small enough. In this case, the distance of the erector lenses from the eye piece takes the place of A in the above formula, and, as this can be made small, the distance B, which is the eye distance or eye relief, can be made longer.

Up to the present time, this principle has been used in the construction of rifle-sighting telescopes, which are mounted on the rifle barrel, where it is essential to have the eye far away from the eye lens to prevent accident to the eye from the recoil of the gun. Thus, gradually the conventional telescopic rifle sights were developed in the art in the form of little telescopes in which eye distances up to 4 inches were obtained with otherwise satisfactory optical results. Although this distance might have been sufficient in some guns or rifles, in most guns the telescope had to have a relatively high or off-set mounting in order to clear the bolt action or some other operating member of the gun which had to be manually actuated. One more inch of eye distance would have permitted to mount the telescope low on the barrel and would have rendered the mounting more substantial and less liable to displacement. Although this situation was well known in the art and from time to time various suggestions and proposals were made to increase the eye distance, none, as far as I am aware, of these various suggestions and proposals was satisfactory and successful and could provide an eye distance greater than 4 inches.

I have discovered that the outstanding problem may be solved in a remarkably simple manner.

It is an object of the present invention to provide a novel and improved rifle-sighting telescope which is free from the disadvantages and inconveniences of conventional rifle-sighting telescopes.

It is another object of the present invention to provide an improved rifle-sighting telescope which permits obtaining eye distances of 5 inches and over so that it can be mounted directly on the rifle barrel in a convenient and low position without requiring any high or off-set mounting.

It is a further object of the invention to provide a rifle-sighting telescope capable of obtaining increased eye distances of considerably more than 4 inches, so that it will readily clear the conventional bolt action even if mounted directly on the rifle barrel, without detrimentally influencing the optical properties of the telescope.

The invention also contemplates a rifle-sighting telescope embodying a negative lens for apparently decreasing the distance between the telescope objective and the eye lens and which increases the eye distance beyond the maximum distance obtainable with conventional rifle-sighting telescopes.

It is also within contemplation of the invention to provide a novel rifle-sighting telescope which is simple in construction, which is easy and inexpensive to build, which can be mounted next to the barrel of the rifle, and which combines accentuated eye distance with excellent overall optical efficiency.

Other and further objects and advantages will become apparent from the following description taken in conjunction with the accompanying drawing, in which:

Fig. 1 illustrates a diagrammatic view of the lens system employed in a conventional rifle-sighting telescope;

Fig. 2 depicts a diagrammatic view of a complete lens system embodying the principles of the present invention;

Fig. 3 is a side elevational view of a rifle with my new rifle-sighting telescope mounted thereon; and Fig. 4 shows a front elevational view of the rifle and telescope illustrated in Fig. 3.

Broadly stated, my invention makes use of the optical principle of projecting the image of an opening instead of the opening itself. According to the principles of my invention, an increased eye distance is obtaned by inserting a negative lens between the erector system and the eye lens, and near the second focus of the erector lens. This negative lens forms a virtual image of the erector lens located near the eyepiece lens and this image, being nearer to the eye lens, will in turn be imaged by the eye lens at a greater distance from it than the erector lens itself would be.

The proper focal length, shape and position of the negative lens depend on the characteristics of the entire rifle sight. If the negative lens were placed exactly in the second focus of the system objective plus erector, it would lengthen the eye distance without changing the field of view or the power of the telescope. If placed between the erector and the said focal point, it would also increase magnification and reduce field; if placed nearer the eye piece, it would lower the magnification and would to a certain extent increase the field. It will, therefore, be obvious to those skilled in the art that the optical system of the invention has a large number of possibilities but as long as a lens negative in character is incorporated in the optical system between erector and eyepiece, it will provide an increase in eye distance. Thus, a rifle-sighting telescope embodying the principles of the present invention may be mounted on a rifle barrel in such a position that it will clear the bolt action, even if mounted directly on the rifle barrel.

Referring now, more particularly, to Fig. 1 of the drawing, a diagrammatic view of the lens system employed in a conventional rifle-sighting telescope is illustrated. Essentially, an objective lens 1 and an eye lens 2 are provided with an erector lens or system 3 located therebetween for obtaining an erect image. A sighting mark or reticule 4 is provided in the focus of the objective lens 1. Reference character 5 denotes the second focus of the erecting system, and reference character 6 the eye of the observer, which it at a distance 7 from the eye lens. Distance 7 is known as the "eye distance" and is the distance at which an image is formed by the eye-piece of either the objective or the erecting lenses of the telescope. This image is known as the "exit pupil" of the telescope and is the only position from which the eye of the observer can see the entire field of view. The exit pupil appears as a small, bright circle when looking at the telescope from a distance.

For practical reasons, it has so far been found impossible to increase the eye distance, i. e., the distance of the exit pupil from the eyepiece lens, beyond 4" without making the telescope too long and bulky. The principles of the present invention make it possible to increase the eye distance to 5", and even more, without unduly increasing the length of the telescope, and also make is possible to increase or decrease the magnification at will without changing the dimensions of the telescope or of the lenses.

The principles and the operation of my improved rifle-sighting telescope will be best understood from Fig. 2 in which the optical system of a preferred embodiment of the invention is illustrated. The optical system includes some of the conventional elements of prior rifle-sighting telescopes such as objective lens 11, eye lens 12 and erector lens or system 13. As in all conventional rifle-sighting telescopes, a sighting mark 14 is provided in the focus of the objective lens 11. However, instead of imaging the erector system directly through the eyepiece lens, a negative lens 19 is inserted between erecting system 13 and eye lens 12, and near the second focus 20 of the erector lens. Negative lens 19 forms a virtual image of the erector lens located near the eyepiece lens, and this image being nearer to the eye lens will in turn be imaged by the eye lens at a greater distance therefrom than the erector lens would be itself. In other words, eye distance 17 corresponding to the distance of the observer's eye 16 from the eye lens 12, will be considerably greater than it was possible heretofore, as those skilled in the art will readily understand. In accordance with the strength and the position of negative lens 19, eye distance 17 may be increased or decreased within relatively wide limits. For example, if this negative lens were placed exactly in the second focus 20 of the erector system, it will not affect the magnification or the field of the telescope at all. If the negative lens were placed between the second focus and the erector lens, it will increase the magnification and decrease the field, while, if the negative lens were placed between the second focus of the erector lens and the eye lens, it will decrease the magnification and increase the field.

The completely assembled rifle-sighting telescope embodying the invention is illustrated in Figs. 3 and 4 as mounted on a rifle in operative position. The complete optical system of the telescope is mounted in a tube 21 constituted of a metal such as brass, bronze, gun metal, steel or some other suitable material having strength. One end of the tube 21 is enlarged at 22, to take care of the larger diameter of the eye lens. The complete telescope is mounted on rifle barrel 23 by means of mounts 24 and 25, in such a position that the right end of the telescope is at a distance of approximately 5 inches from the proper position of the eye. As it will be readily observed from Fig. 3, in this position the end of the telescope will readily clear the bolt action 26 and thus may be mounted very close to the rifle barrel without interfering in any way with the proper operation of the rifle. In other words, the distance 27 between the axes of rifle barrel 23 and of telescope 21 (Fig. 4) may be very short so that short mounts 24 and 25 may be used providing a strong and stable mounting free from the danger of accidental displacements. Moreover, as it will be readily observed from Fig. 4, the rifle-sighting telescope embodying the invention will clear the bolt action of the rifle even if mounted in immediate proximity to the rifle barrel and having its axis perpendicularly above and in alignment with the axis of the rifle barrel, in contrast to prior rifle-sighting telescopes which had to be mounted in a raised and/or off-set position.

The optical properties of my improved rifle-sighting telescope may be best seen from the following table of a preferred embodiment:

| | mm. |
|---|---|
| Distance between eye lens and objective | 252.4 |
| Distance between eye lens and negative lens | 53 |
| Distance between negative lens and erector system | 97.8 |
| Distance between erector system and objective | 113.8 |
| Distance between reticule and objective | 60 |

The lenses employed in the rifle-sighting telescope have the following properties:

| | Diameter | Type |
|---|---|---|
| | Millimeters | |
| Eye lens | 23 | Compound positive. |
| Negative lens | 16 | Single negative. |
| Erector system | 16 | Compound positive. |
| Objective | 17.5 | Do. |

Preferably, a diaphragm having a diameter of 12.5 mm. is provided between the eye lens and the negative lens, at a distance of 43.8 mm. from the eye lens. A diaphragm having a diameter of 8.2 mm. is provided at the point where the reticule is located.

The rifle-sighting telescope embodying the above combination of lenses has the following properties:

| | |
|---|---|
| Exit pupil | 6.6 mm. |
| Magnification | 2.5× |
| Eye distance | 124.5 mm. |
| Field | 5°5′ |

It will be noted that the rifle-sighting telescope embodying my invention provides a number of important advantages. Thus, my novel rifle-sighting telescope makes it possible for the first time in the history of the art to provide eye distances over 4 inches.

It is also to be observed that my rifle-sighting telescope makes eye distances of 5 inches easily obtainable so that the telescope may be mounted directly on the rifle barrel without interfering in any way with the bolt action and provides a stable and true adjustment which will not be displaced or accidentally changed under the most adverse operating conditions.

Moreover, the novel and improved rifle-sighting telescope combines the advantage of increased eye distance with excellent optical properties, such as ample magnification and field which are at least equivalent to those of prior telescopes having inferior eye distances.

Furthermore, the novel rifle-sighting telescope may be manufactured in a simple and efficient manner by means of existing manufacturing equipment without requiring any expensive changes.

Although the present invention has been described in connection with a preferred embodiment thereof, variations and modifications may be resorted to by those skilled in the art without departing from the principles of the present invention. I consider all of these variations and modifications as within the true spirit and scope of the present invention as disclosed in the present description and defined by the appended claims.

I claim:

1. In a lens system for rifle-sighting telescopes, the combination comprising an objective, an eye lens cooperating with said objective to produce an enlarged image, an erector system constituted of at least one erector lens interposed between said objective and said eye lens, a negative lens interposed between the erector system and the eye lens in proximity to the second focus of said erector lens, said negative lens being adapted to increase the eye distance of said lens system substantially without changing the field of view and the power of said lens system, and means for holding said lenses in predetermined operative position to form a compact and integral unit adapted to be mounted on a rifle barrel in such a position that the eye of the operator is in proximity to the firing chamber but at a distance therefrom sufficient to positively eliminate the danger of injury from the recoil of the rifle.

2. In a lens system for rifle sighting telescopes, the combination comprising an objective, an eye lens cooperating with said objective to produce an enlarged image, an erector system constituted of at least one erector lens interposed between said objective and said eye lens, a negative lens interposed between the erector system and the eye lens substantially in the second focus of said erector lens, said negative lens being adapted to increase the eye distance of said lens system beyond 4″ substantially without changing the field of view and the power of said lens system, and means for holding said lenses in predetermined operative position to form a compact and integral unit adapted to be mounted on a rifle barrel in such a position that the eye of the operator is in proximity to the firing chamber but at a distance therefrom sufficient to positively eliminate the danger of injury from the recoil of the rifle.

FREDERICK L. G. KOLLMORGEN.